(12) United States Patent
Turner et al.

(10) Patent No.: US 7,665,283 B2
(45) Date of Patent: *Feb. 23, 2010

(54) MODULAR VEHICLE SYSTEM HAVING ENGINE UNIT AND MOWER UNIT FOR COMMUNICATION THEREWITH

(75) Inventors: Christopher David Glenn Turner, Erie, IL (US); John Franklin Reid, Champaign, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/045,392

(22) Filed: Mar. 10, 2008

(65) Prior Publication Data

US 2008/0209877 A1 Sep. 4, 2008

Related U.S. Application Data

(62) Division of application No. 11/473,255, filed on Jun. 22, 2006, now abandoned, which is a division of application No. 10/697,346, filed on Oct. 30, 2003, now Pat. No. 7,089,721.

(51) Int. Cl.
*A01D 41/127* (2006.01)
(52) U.S. Cl. .................................... 56/10.2 A; 56/10.5
(58) Field of Classification Search .............. 56/10.2 A, 56/10.2 R, 10.5, 10.6, 10.7, 10.8, 11.3, 11.7, 56/10.1; 700/253, 23, 25; 701/23, 25
See application file for complete search history.

(56) References Cited

U.S. PATENT DOCUMENTS

| | | |
|---|---|---|
| 3,144,723 A | 8/1964 | Carter |
| 3,729,910 A | 5/1973 | Hardee |
| 4,178,741 A | 12/1979 | Lonn et al. |
| 4,482,960 A | 11/1984 | Pryor |
| 4,500,970 A | 2/1985 | Daemmer |
| 4,539,483 A | 9/1985 | Freeny, Jr. |
| 4,777,785 A * | 10/1988 | Rafaels .................... 56/10.2 A |
| 5,086,614 A | 2/1992 | Pestka |
| 5,351,778 A | 10/1994 | Shigemi et al. |

(Continued)

OTHER PUBLICATIONS

Stone, Marvin L. et al. ISO 11783: An Electronic Communications Protocol For Agricultural Equipment. ASAE Distinguished Lecture #23, Agricultural Equipment Technology Conference, Feb. 7-10, 1999, Louisville, Kentucky USA. [online], Feb. 1999 [retrieved on Nov. 16, 2006]. Retrieved from the Internet:<URL:http://asae.frymulti.com/data/pdf/6/ddp2002/lecture23.pcf>.

(Continued)

*Primary Examiner*—Thomas B Will
*Assistant Examiner*—Jamie L McGowan
(74) *Attorney, Agent, or Firm*—Yee & Associates, P.C.; Marilyn Smith Dawkins

(57) ABSTRACT

A modular vehicle system comprises an engine unit and an engine management controller associated with the engine unit. A throttle actuator is associated with the engine management controller to control a throttle setting of an engine unit. A mower unit is associated with mower electronics. A blade clutch actuator activates or deactivates a cutting blade of the mower unit. A transmission line supports communications between the engine management controller and the mower electronics to support remote control mowing or unmanned mowing activities.

15 Claims, 7 Drawing Sheets

U.S. PATENT DOCUMENTS

| | | |
|---|---|---|
| 5,444,965 A | 8/1995 | Colens |
| 5,572,856 A | 11/1996 | Ku |
| 6,109,010 A | 8/2000 | Heal et al. |
| 6,212,448 B1 | 4/2001 | Xydis |
| 6,339,735 B1 | 1/2002 | Peless et al. |
| 6,591,593 B1 * | 7/2003 | Brandon et al. ............... 56/10.6 |
| 6,650,975 B2 | 11/2003 | Ruffner |
| 6,668,530 B2 | 12/2003 | Kern et al. |
| 6,779,323 B2 * | 8/2004 | Hancock et al. ........... 56/10.2 J |
| 6,885,912 B2 | 4/2005 | Peless et al. |
| 7,010,425 B2 | 3/2006 | Gray et al. |
| 7,089,721 B2 * | 8/2006 | Turner et al. .............. 56/10.2 A |

OTHER PUBLICATIONS

International Standards Organization, ISO 11783-9.2002, Tractors and Machinery for Agriculture and Forestry-Serial Control and Communications Data Network-Part 9 Tractor ECU, p. 9 (2002).

* cited by examiner

US 7,665,283 B2

MODULAR VEHICLE SYSTEM HAVING ENGINE UNIT AND MOWER UNIT FOR COMMUNICATION THEREWITH

This is a divisional application of application Ser. No. 11/473,255 filed on Jun. 22, 2006 now abandoned, which is a divisional application of application Ser. No. 10/697,346, filed Oct. 30, 2003 now U.S. Pat. No. 7,089,721.

FIELD OF THE INVENTION

This invention relates to a modular vehicle system having an engine unit and a mower unit for communication therewith.

BACKGROUND OF THE INVENTION

A modular vehicle system may include an engine unit for propulsion and an implement unit. If an operator is manning or supervising a modular vehicle, the status of the implement may be observed visually, aurally or through gauges on an instrument panel. However, if an operator is not manning a modular vehicle or if the operator is impaired or distracted, there is a need provide technology that is a proxy for the observations, reactions, and control of the operator. Thus, there is a need for a modular vehicle system having an engine unit and a mower unit for communication therewith that supports unmanned operation or assistance to manned operation.

SUMMARY OF THE INVENTION

A modular vehicle system comprises an engine unit and a mower unit. The mower unit and the engine unit communicate via a wireless or wire-line communications link. The mower unit may transmit status data to the engine unit on activation or deactivation of the cutting blade of the mower unit via the communications link. If the mower unit and the engine unit are mechanically disconnected, an operation of the mower is stopped or other precautionary measures are undertaken.

DESCRIPTION OF THE PREFERRED EMBODIMENT

"Vehicle" shall refer to the modular vehicle system that includes a mower unit and an engine unit. The mower unit may be pulled by the engine unit, pushed by the engine unit, supported by the engine unit or otherwise integrated with the engine unit. A "communications link" refers to a transmission line that supports the transmission of an electrical or electromagnetic signal or wireless transceivers that communicate via an electromagnetic signal. "Status data" may relate to the operation or performance of the mower unit, the engine unit or both. A "status signal" refers to a transmission or continuity check signal (e.g., a pulse, a direct current signal, a modulated carrier or an audio tone) sent over a communications link between the mower unit and the engine unit to test the integrity of the communications link (e.g., transmission line, wireless communications link or other communications channel).

Figure 1:
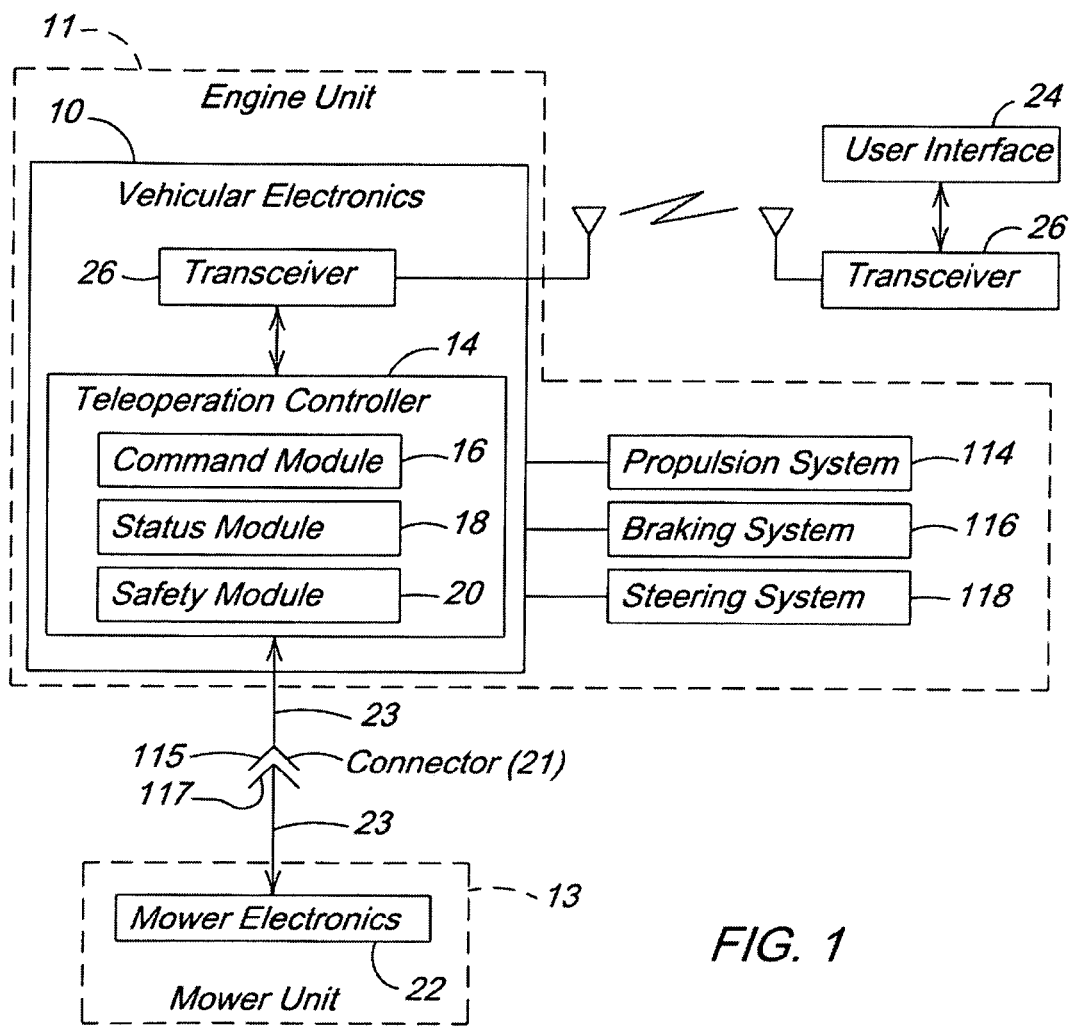
FIG. 1 is a block diagram of a first embodiment of a modular vehicle system that is suitable for remote control of mowing by a user.

In FIG. 1, a modular vehicle comprises an engine unit 11 coupled to a mower unit 13. In one embodiment, the engine unit 11 tows, pushes or pulls the mower unit 13. The engine unit 11 comprises vehicular electronics 10, a propulsion system 114, a steering system 118, and a braking system 116. The mower unit 13 comprises mower electronics 22 and a mechanical mowing assembly. The mower electronics 22 communicates with the vehicular electronics 10 via a communications link (e.g., transmission line 23).

A user interface 24 supports the entry or selection of input data for at least one of the vehicular electronics 10 and mower electronics 22. The user interface 24 may also support the display of output or status data to a user with respect to the vehicular electronics 10 and the mower electronics 22. In one embodiment, the user interface 24 communicates to the vehicular electronics 10 via a pair of transceivers 26. One transceiver 26 is co-located with the user interface 24, whereas the other transceiver 26 is co-located with the vehicular electronics 10. The pair of transceivers 26 may use a modulation scheme, which is resistant to jamming or interference, such as frequency-hopping spread-spectrum (FHSS) or code-division multiple-access (CDMA).

In the embodiment of FIG. 1, the vehicular electronics 10 comprises a tele-operation controller 14. The tele-operation controller 14 further comprises a command module 16, a status module 18, and a safety module 20. The command module 16 facilitates the forwarding of user commands entered or inputted via the user interface 24 to at least one of the propulsion system 114, the steering system 118, braking system 116, and the mower unit 13. The status module 18 supports transmitting status information (e.g., feedback) on at least one of the following to a user interface 24: the propulsion system 114, steering system 118, braking system 116, mower electronics 22, and mower unit 13. The safety module 20 may stop or change the course of the vehicle to avoid striking an obstacle or person or entering into a hazardous zone. The safety module 20 may over-ride user input from the user interface 24, if necessary for safety reasons.

For remote control operation of the modular vehicle, a user interface 24 is coupled to a transceiver 26 supporting remote control of at least one of the emergency stopping movement of the mower, emergency stopping of the cutting blade, adjustment of mowing height, activating rotation of the cutting blade, deactivating rotation of the cutting blade, and detecting an obstacle around the mower.

In one embodiment, the transmission line 23 comprises one or more of the following: coaxial cable, flexible coaxial cable, a cord, a cable assembly, a bundle of wires, an optical transmission line, and a wiring harness. The transmission line may be associated with one or more electrical connectors 21. For example, an electrical connector 21 may comprise a first electrical connector portion 115 that mates with a second electrical connector portion 117, where the first electrical connector portion 115 is associated with the engine unit (e.g., 11) and wherein the second electrical connector portion is associated with the mower unit 13. The first electrical connector portion 115 may be male or female or otherwise capable of mating with or interlocking with the second electrical connector portion 117. Ethernet or other communication standards or protocol may be used for communications via the transmission line 23 between the engine unit 11 and the mower unit 13.

The vehicular electronics 10, the mower electronics 22, or both are arranged to electro-mechanically, mechanically, electrically, optically, electromagnetically or ultrasonically sense whether the engine unit 11 is mechanically connected to or disconnected from the mower unit 13. The connection may be realized by hitching or connecting the engine unit 11 to the mower unit 13. Further, an emergency-stop of the mower unit 13 is provided by a cord or electrical connection between the engine unit 11 and mower unit 13 that removes electrical power to the mower unit 13 if it is not connected to the engine unit 11.

Figure 2:
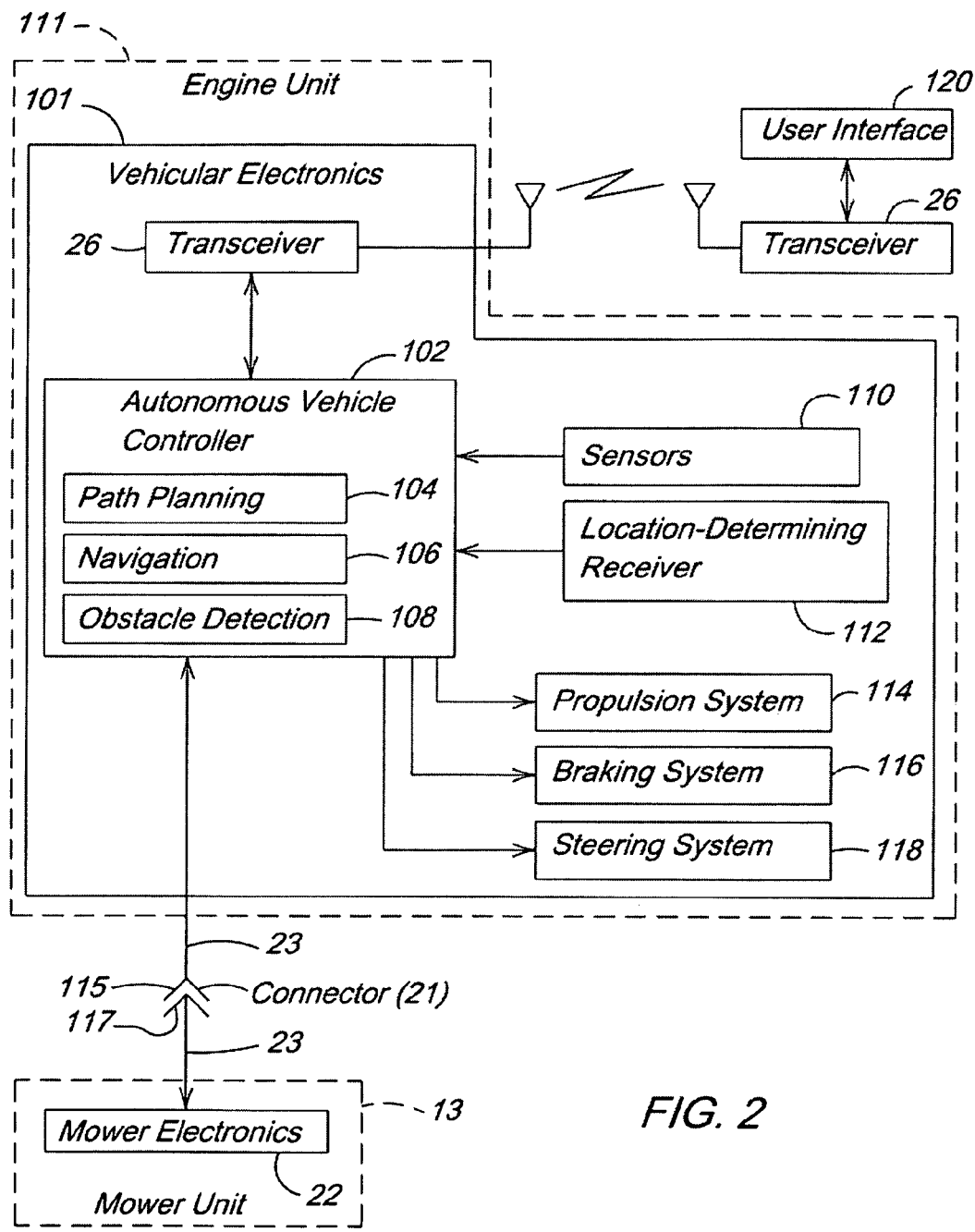
FIG. 2 is a block diagram of a second embodiment of a modular vehicle system that is suitable for unmanned mowing.

The vehicular electronics 101 of FIG. 2 differ from the vehicular electronics 10 of FIG. 1. In FIG. 2, the vehicular electronics 101 is configured for unmanned operation or user-assisted operation, whereas the vehicular electronics 10 of FIG. 2 support wireless remote control or tele-operation by a user. The vehicular electronics 101 comprises an autonomous vehicle controller 102 that receives input data (e.g., status data) from any of the following: one or more sensors 110, a location-determining receiver 112, the mower unit 13, and the mower electronics 22. One of the sensors 110 may comprise an ultrasonic or laser sensor, for example. The location-determining receiver 112 may comprise a Global Positioning System (GPS) receiver, with or without differential correction. The autonomous vehicle controller 102 provides output data (e.g., command data) to one or more of the following: a propulsion system 114, a braking system 116, a steering system 118, mower electronics 22, and a mower unit 22. The autonomous vehicle controller 102 communicates with the mower electronics 22 via a transmission line 23, such as a cable or a wiring harness.

A user interface 120 is coupled to a transceiver 26. The transceiver 26 communicates with another transceiver 26 associated with the vehicular electronics 101 via an electromagnetic signal (e.g., radio frequency signal). For example, the user interface 120 and transceivers 26 may support the issuance of a command by a user to stop the vehicle, to stop mowing, to stop a blade from rotating, to turn off the vehicle or to take another safety measure or precaution. The autonomous controller processes commands received from the user interface 120 via the transceivers 122.

For unmanned operation of the modular vehicle, a location-determining receiver 112 determines a location of the engine unit 111 or the modular vehicle system. A path planning 104 module establishes a planned path for the engine unit 111 or the modular vehicle system. A navigation 106 module guides the vehicle along the planned path based on the determined location of the engine unit 111 or vehicle. An obstacle detection 108 module detects obstacles in at least one of the planned path and a defined region about the vehicle.

Figure 3:
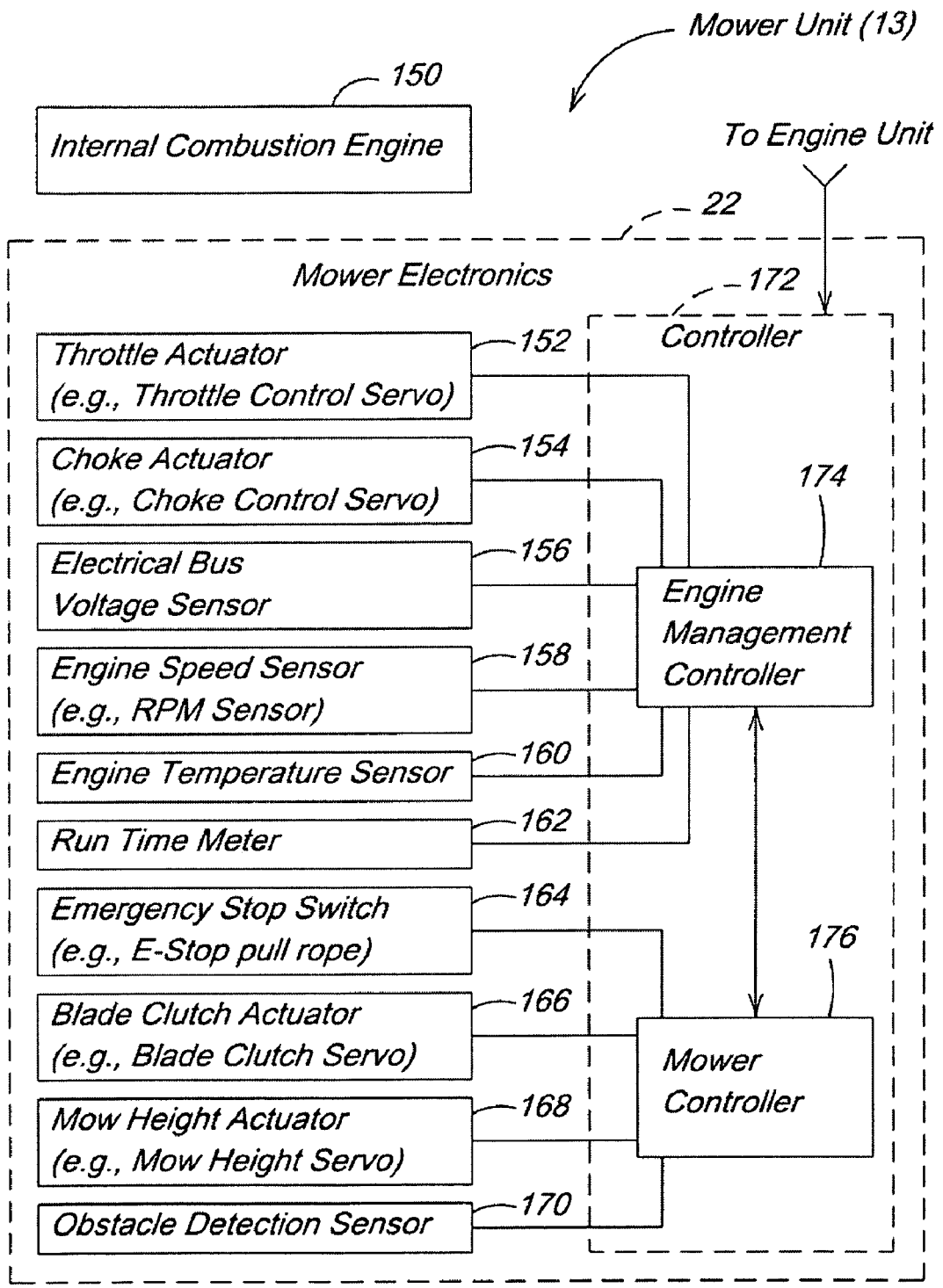
FIG. 3 is a block diagram of mower electronics in accordance with the modular vehicle system of FIG. 1 and FIG. 2

FIG. 3 illustrates a mower unit 13 in greater detail than FIG. 1 and FIG. 2. The mower unit 13 comprises an internal combustion engine 150 associated with mower electronics 22. The internal combustion engine 150 may be configured to drive or rotate one or more cutting blades of the mower unit 13. The mower electronics 22 comprises a controller 172. In one embodiment, the controller comprises an engine management controller 174 and a mower controller 176, although various single-processor and multiple-processor architectures may be used to carry out the invention.

The engine management controller 174 receives input data from one or more sensors and sends output data (e.g., command data), responsive to the input data, to one or more actuators. In one embodiment, the sensors associated with the engine management controller 174 comprise one or more of the following: an electrical bus voltage sensor 156, an engine speed sensor 158 (e.g., RPM sensor), an engine temperature sensor 160, and a run time meter 162. The actuators associated with the engine management controller 174 comprise one or more of the following: throttle actuator 152 (e.g., a throttle control servo), a choke actuator 154 (e.g., a choke control servo), and an engine disable switch (e.g., fuel supply or electrical cut-off switch for the internal combustion engine).

The engine speed sensor 158 may comprise a tachometer or another device for measuring the revolutions per unit time of a shaft (e.g., a crankshaft) of the internal combustion engine 150. The engine temperature sensor 160 may sense the temperature of an engine block, coolant or a lubricant associated with the internal combustion engine 150. The run-time meter 162 may provide a record of cumulative duration of engine operation over the life time of the internal combustion engine 150 or a per session duration of engine operation.

The throttle actuator 152 controls a throttle setting of the internal combustion engine 150. In one embodiment, the throttle actuator 152 has a throttle position or setting that is controlled by pulse width modulation (PWM). The choke actuator 154 may control an intake air flow to the internal combustion engine 150.

In one embodiment, the engine management sensors and actuators may be coupled to the engine management controller 174 via a databus or directly to the engine management controller 174 via discrete conductors. A sensor may provide an analog or a digital output. Accordingly, if a sensor provides an analog output, an analog-to-digital converter may be interposed between the analog sensor and the engine management controller 174 to provide a digital signal to the engine management controller 174.

The mower controller 176 receives input data (e.g., status data) from one or more sensors and sends output data (e.g., command data), responsive to the input data, to one or more actuators. In one embodiment, the sensors associated with the mower controller 176 comprise: an emergency stop switch 164 (e.g., emergency stop, pull rope) and an obstacle detection sensor 170. The actuators associated with the mower controller 176 comprise one or more of the following: a blade clutch actuator 166 (e.g., a blade clutch servo) and a mow height actuator 168 (e.g., mow height servo). The blade clutch actuator 166 is associated with the mower electronics 22 and supports the coupling or decoupling of the blade from a rotational energy source (e.g., the shaft of an internal combustion engine 150). The mow height actuator 168 supports adjustment of a cutting height of the cutting blades.

The controller 172 of the mower unit 13 communicates with the engine unit (e.g., 11 or 111). For example, the controller 172 of the mower unit 13 may communicate with the autonomous vehicular controller 102 of FIG. 2 or with the tele-operation controller 14 of FIG. 1.

Figure 4:
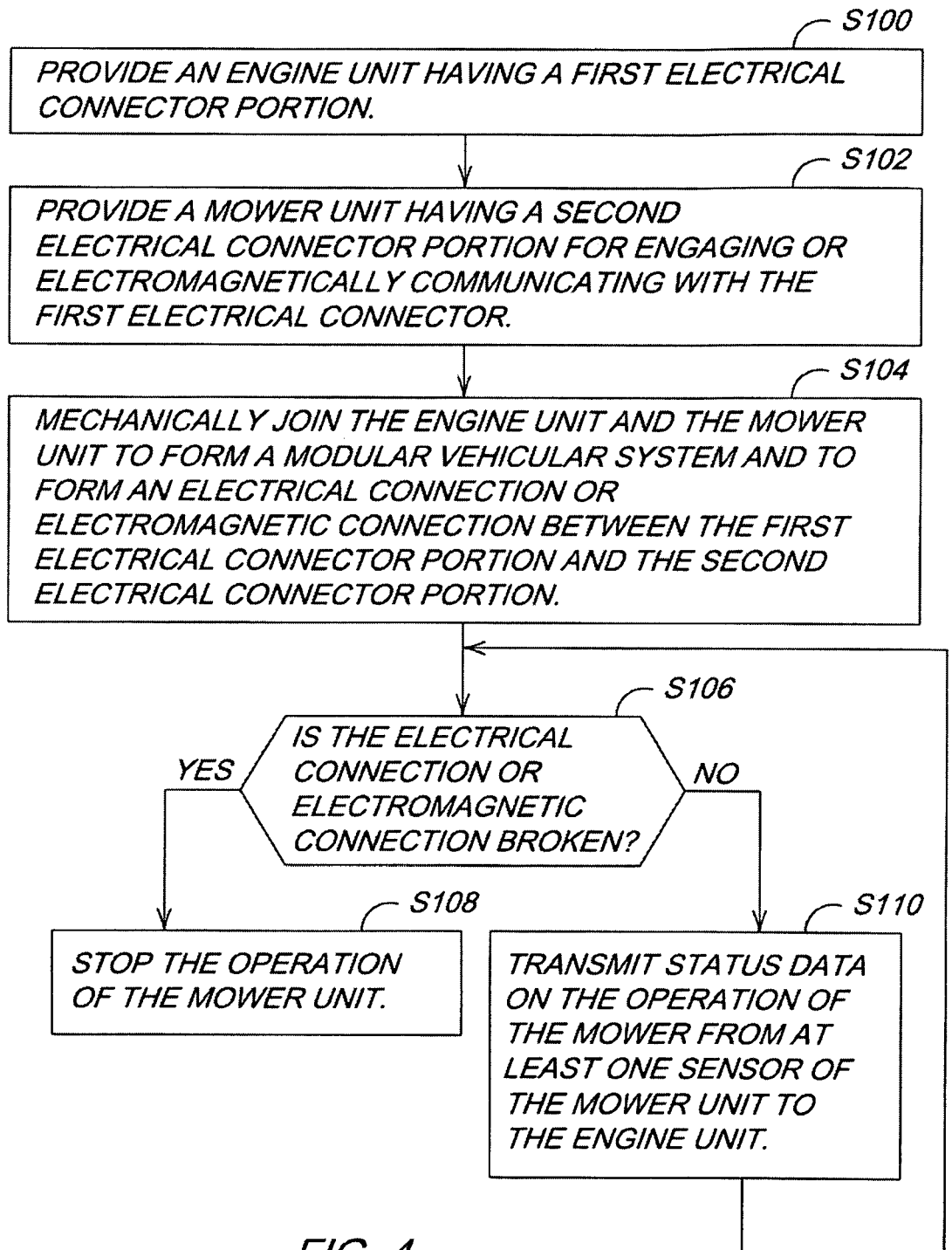
FIG. 4 is a first example of a method for managing the unmanned operation of a modular vehicle system.

FIG. 4 is a method of managing the modular vehicle system for unmanned operation. The method begins with step S100.

In step S100, an engine unit (e.g., 11 or 111) is provided and has a first electrical connector portion 115.

In step S102, a mower unit (e.g., 13) is provided and has a second electrical connector portion for engaging (or electromagnetically or electrically communicating with) the first electrical connector portion 117.

In step S104, the engine unit (e.g., 11 or 111) and the mower unit (e.g., 13) are mechanically joined or coupled to form a modular vehicle system and to form an electrical connection or electromagnetic connection between the first electrical connector portion 115 and the second electrical connector portion 117.

In step S106, mower electronics 22, the mower controller 176 or the engine management controller 174 determines if the electrical connection or electromagnetic connection formed in step S104 is or has been broken or provides a deficient communications channel. A deficient communications channel means that no electrical current or electromagnetic energy is conducted through the transmission line 23 between the mower unit and the engine unit because of the lack of a complete direct current circuit or a complete alternating current circuit. If the electrical connection or electromagnetic connection has been broken or provides a deficient communications channel, the method continues with step S108. If the electrical connection has not been broken or provides an adequate communications channel, the method continues with step S110.

In one embodiment, the mower unit (e.g., 13) may include a signal generator that transmits a status signal over the communications link (e.g., transmission line) between the engine unit (e.g., 11 or 111) and the mower unit. If the vehicular electronics does not receive the transmitted status signal from the engine unit, the continuity of the electrical or electromagnetic connection is broken (i.e., the communications channel is deficient).

In step S108, the mower electronics 22, the mower controller 176, or the engine management controller 174 stops an operation of the mower unit 13. For example, at least one of the mower electronics 22, the mower controller 176, and the engine management controller 174 may send a command to execute any of the following actions: (a) disengaging the mower blade, (b) activating the blade clutch or the blade clutch actuator 166 to withdraw rotational power from the blade, (c) stopping the rotation of the blade via the clutch actuator 166 or otherwise, (d) changing the throttle setting via the throttle actuator 152 to reduce or eliminate the flow of fuel to the internal combustion engine 150, (e) switching off high voltage provided to one or more spark plugs of the internal combustion engine 150, (f) shutting off electrical energy provided to an electrical system (e.g., high voltage coil) of the internal combustion engine 150 or (g) turning off the internal combustion engine 150.

In step S110, at least one of the mower electronics 22, the controller 172, the engine management controller 174, and the mower controller 176 transmits status data on the operation of the mower unit 13 from at least one sensor of the mower unit to the engine unit (11 or 111). The status data is transmitted from the mower unit 13 to the engine unit (11 or 111) via the electrical connection formed in step S104. The method continues with step S106 following step S110. The method may execute any number of loops between step S110 and step S106 until the loop is interrupted by breaking or discontinuity of the electrical connection in step S106.

Figure 5:
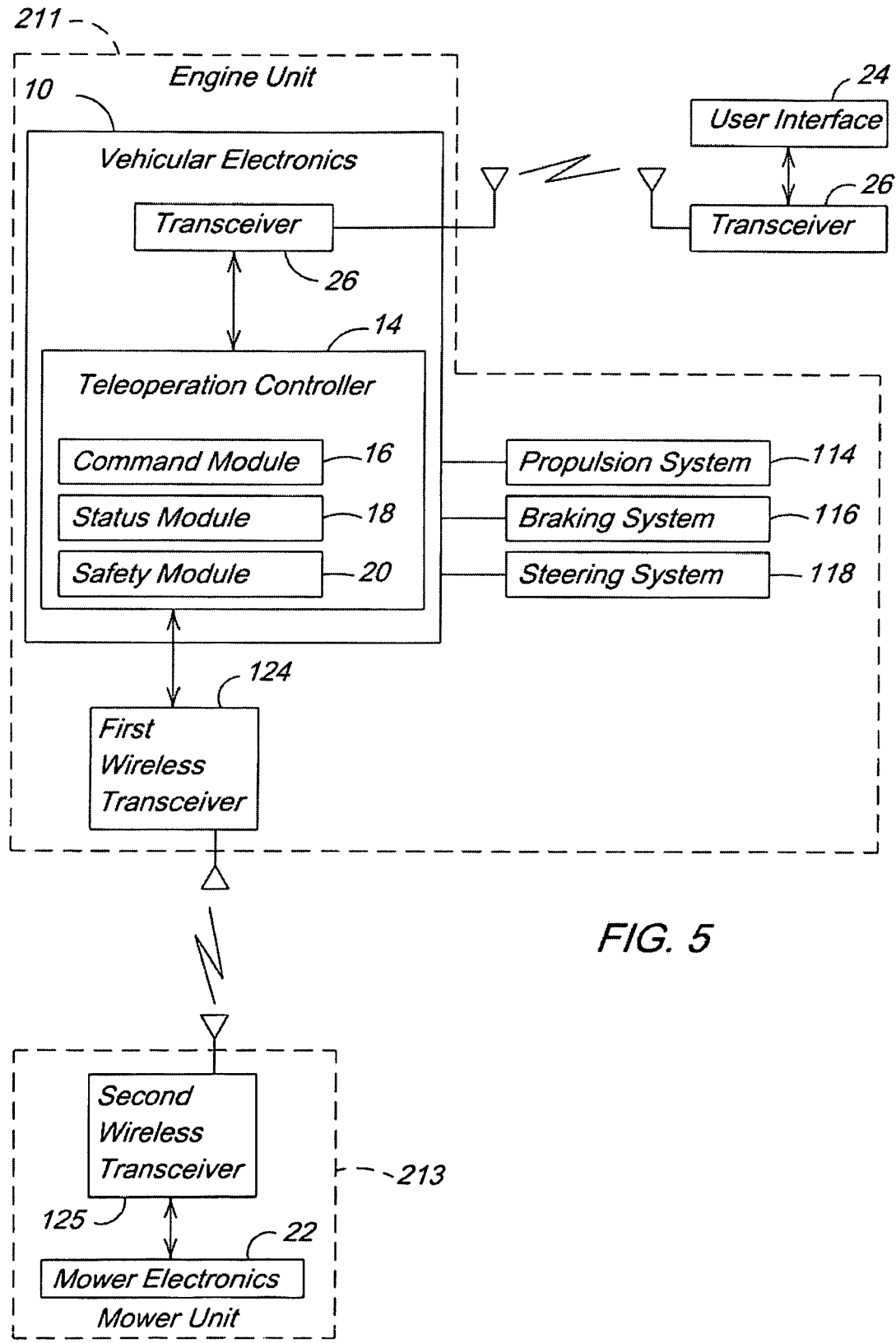
FIG. 5 is a block diagram of a third embodiment of a modular vehicle system.

FIG. 5 illustrates a configuration of a modular vehicle system that is similar to that of FIG. 1, except the engine unit 211 and a mower unit 213 are associated with wireless transceivers (124, 125) that support wireless communication between the vehicular electronics 10 and the mower electronics 22. Like reference numbers in FIG. 5 and FIG. 1 indicate like elements. The first wireless transceiver 124 and the second wireless transceiver 125 of FIG. 5 replace the transmission line 23 and associated wire-line communications of FIG. 1. The wireless transceivers (124, 125) may comprise Blue-Tooth devices, unlicensed code-division multiple access devices or other communication devices. Bluetooth is a wireless communications protocol that may be applied to the replacement of wires or cables with a short-range wireless communications equipment.

Figure 6:
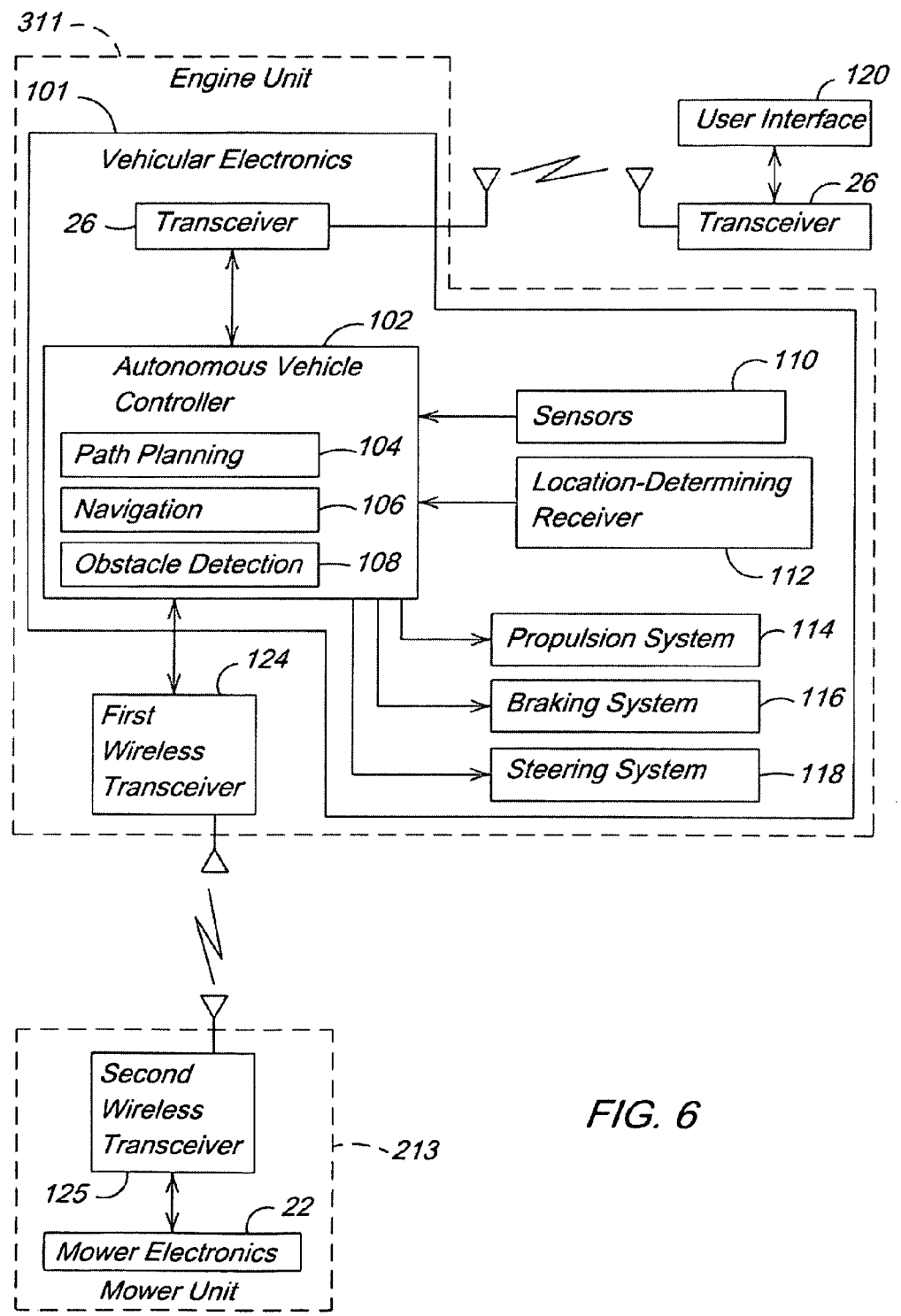
FIG. 6 is a block diagram of a fourth embodiment of a modular vehicle system.

FIG. 6 illustrates a configuration of a modular vehicle system that is similar to that of FIG. 2, except the engine unit 311 and a mower unit 213 are associated with wireless transceivers (124, 125) that support wireless communication between the vehicular electronics 10 and the mower electronics 22. Like reference numbers in FIG. 2 and FIG. 6 indicate like elements. The wireless transceivers (124, 125) of FIG. 6 replace the transmission line of FIG. 2. The wireless transceivers may comprise Blue-Tooth devices, unlicensed code-division multiple access devices or other communication devices.

Figure 7:
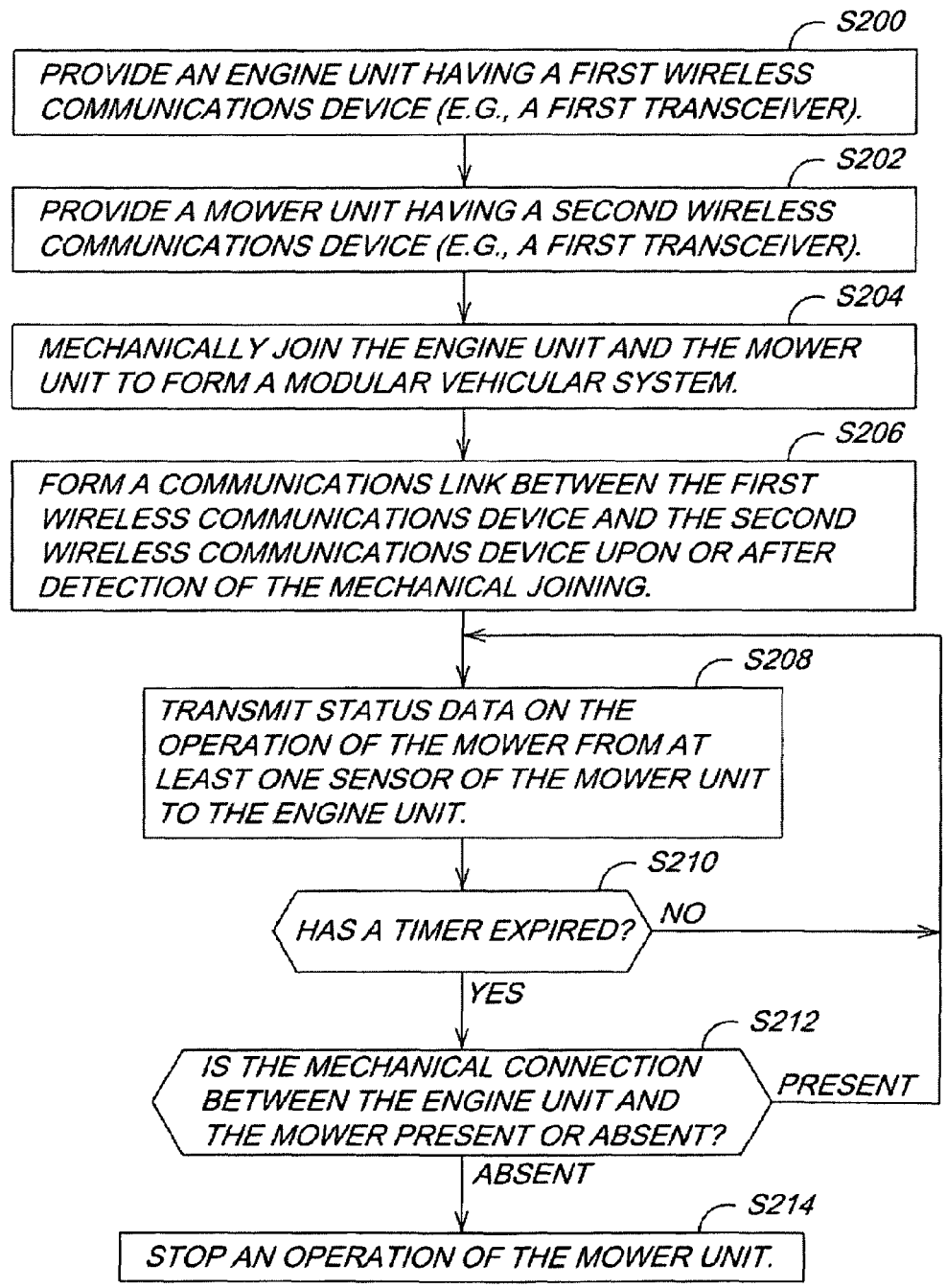
FIG. 7 is a second example of a method for managing the unmanned operation of a modular vehicle system.

FIG. 7 is a method of managing the modular vehicle system for unmanned operation. The method begins with step S200.

In step S200, an engine unit (e.g., 211 or 311) is provided having a first wireless communications device (e.g., a first wireless transceiver 124).

In step S202, a mower unit (e.g., 213) is provided having a second wireless communications device (e.g., a second wireless transceiver 125).

In step S204, the engine unit (211 or 311) and the mower unit 213 are joined to form a modular vehicular system.

In step S206, a communications link is formed between the first wireless communications device and the second wireless communications device upon or after detection of the mechanical joining. For example, the engine unit and the mower unit may be hitched or removably fastened together. The communications link may represent a simplex, duplex, two-way or one-way communications channel that is established in a continuous, regular or intermittent basis.

In step S208, at least one of the mower electronics 22, the controller 172, the engine management controller 174, and the mower controller 176 transmits status data on the operation of the mower unit 13 from at least one sensor of the mower unit 13 to the engine unit (211 or 311). For example, the mower unit 13 transmits the status data from the second wireless communications device 125 to the first wireless communications device 124 via an electromagnetic signal (e.g., a radio frequency signal).

In step S210, the mower electronics 22 determines if a timer has expired. If the time has expired, the method continues with step S212. However, if the timer has not expired, the method continues with step S208.

In step S212, the mower electronics 22 determines if the mechanical connection between the engine unit (211 or 311) and the mower unit 213 is absent or present. If the mechanical connection is present, the method continues with step S208. However, if the mechanical connection is absent, the method continues with step S214.

In step S214, an operation of the mower unit is stopped. Contrary to the method of FIG. 4, the stopping of the mower can be initiated by the vehicular electronics 10, the mower electronics 22, or both because of the communications link between the first wireless communications device 124 and the second wireless communications device 125. Accordingly, step S214 may be accomplished by various alternate and cumulative techniques. Under a first technique, the safety module 20 of the tele-operation controller 14 sends command data to the mower electronics 22 via the communications link (e.g., via the first wireless transceiver 124 and the second wireless transceiver 125) to do one or more of the following actions: to stop the operation of the mower unit 213, to stop the rotation of one or more mower blades of the mower unit 213, to shut-off the internal combustion engine 150 of the mower unit 213, to stop the mower unit 213 from moving, to activate the blade clutch actuator 166, and to actuate the obstacle detection sensor 170.

Under a second technique, the vehicular module of the engine unit (211 or 311) sends command data to the mower electronics 22 via the communications link (124, 125) to do one or more of the following actions: to stop the operation of the mower unit 213, to stop the rotation of one or more mower blades of the mower unit 213, to shut off the internal combustion engine 150 of the mower unit 213, or to stop the mower unit 213 from moving.

Under a third technique, the mower electronics 22, the engine management controller 174, the mower controller 176 or the controller 172 of the mower unit 213 sends command data to do one or more of the following actions: to stop the operation of the mower unit 213, to stop the rotation of one or more mower blades of the mower unit 213, to shut off the internal combustion engine 150 of the mower unit 213, or to stop the mower unit from moving.

The invention may be configured such that the engine unit tows the mower unit behind the engine unit, which is remote-controlled by a user or unmanned. The modular vehicle may be used to mow field perimeters, foliage between tree rows in orchards, vine rows in vineyards, and other applications where unmanned mowing is advantageous.

Having described the preferred embodiment, it will become apparent that various modifications can be made without departing from the scope of the invention as defined in the accompanying claims.

What is claimed is:

1. A modular vehicle, the modular vehicle comprising:
    an engine unit comprising vehicular electronics and a propulsion system, the vehicular electronics controlling the propulsion system and a braking system;
    a mower unit comprising mower electronics and an energy source, distinct from the propulsion system, for driving or rotating at least one cutting blade, the mower electronics distinct from the vehicular electronics;
    the mower electronics controlling the energy source and at least one of a mow height and a blade clutch;
    a communications link for communicating between the vehicular electronics and the mower electronics;
    command data capable of being sent separately from each of the mower electronics and vehicular electronics via the communications link to perform at least one of i) stopping the operation of the mower unit, ii) stopping a rotation of the at least one cutting blade, iii) shutting off the energy source, and iii) stopping the mower unit from moving; and a mechanical connection between the engine unit and the mower unit wherein the command data is sent to stop at least one operation of the mower if the mechanical connection is absent.

2. The modular vehicle according to claim 1 further comprising:
    a user interface;
    a remote transceiver coupled to the user interface and supporting remote control of at least one of the following: emergency stopping of the mower unit, emergency stopping of a blade of the mower unit, adjustment of a mowing height of the mower unit, activating rotation of a blade of the mower unit, deactivating rotation of the blade of the mower unit, directing motion of the mower unit, directing a position of the mower unit, and detecting an obstacle around the mower unit.

3. The modular vehicle according to claim 1 further comprising:
    a location determining receiver for determining a location of the engine unit;
    a path planning module for establishing a planned path for the engine unit,
    a navigation module for guiding the vehicle along the planned path based on the determined location,
    an obstacle detection module to detect obstacles in at least one of the planned path and a defined region about the mower.

4. The modular vehicle according to claim 1 further comprising:
    an obstacle detection sensor for detecting obstacles in a defined region about the mower, the obstacle detection sensor associated with the mower electronics.

5. The modular vehicle according to claim 1 wherein the vehicular electronics further comprises a mower controller for managing at least one of an emergency stop switch, a blade clutch actuator, a mow height actuator, an engine disable switch, and an obstacle detection sensor.

6. The modular vehicle according to claim 1 wherein the engine unit is arranged to pull or tow the mower unit.

7. The modular vehicle according to claim 1 wherein the engine unit is arranged to push the mower unit.

8. The modular vehicle according to claim 1 further comprising a status continuity signal transmitted over the communications link during operation.

9. The modular vehicle according to claim 1 wherein the vehicular electronics further comprises:
    an engine unit transceiver;
    a status module for transmitting status information via the engine unit transceiver on at least one of the propulsion system, the mower unit, and the mower electronics.

10. The modular vehicle according to claim 1 further comprising:
    an engine unit transceiver associated with the vehicular electronics;
    a user interface;
    a remote transceiver coupled to the user interface, the remote transceiver arranged for communication with the engine unit transceiver; and
    an emergency stop switch, associated with the mower electronics, for emergency stopping via a mower controller in response to input from the user interface.

11. The modular vehicle according to claim 1 further comprising:
    an engine unit transceiver associated with the vehicular electronics;
    a user interface;
    a remote transceiver coupled to the user interface, the remote transceiver arranged for communication with the engine unit transceiver; and
    a blade clutch actuator switch, associated with the mower electronics, for decoupling the at least one cutting blade from the energy source in response to input from the user interface.

12. The modular vehicle according to claim 1 further comprising:
    an engine unit transceiver associated with the vehicular electronics;
    a user interface;
    a remote transceiver coupled to the user interface, the remote transceiver arranged for communication with the engine unit transceiver; and a mow height actuator, associated with the mower electronics, for adjusting a cutting height of the at least one cutting blade in response to input from the user interface.

13. The modular vehicle according to claim 1 further comprising a first transceiver in the engine unit and a second transceiver in the mower unit for receiving remote control of at least one of the vehicular electronics and mower electronics.

14. The modular vehicle according to claim 13 further comprising a safety module in the vehicular electronics for overriding the remote control by sending the command data from the vehicular electronics to the mower electronics over the communications link.

15. The modular vehicle of claim 1 further comprising an autonomous vehicle controller in the vehicular electronics for unmanned operation of navigating the modular vehicle along a planned path.

* * * * *